(12) United States Patent
Tomita et al.

(10) Patent No.: US 10,892,593 B2
(45) Date of Patent: Jan. 12, 2021

(54) LASER DEVICE, METHOD FOR CONTROLLING LASER DEVICE, AND MASS SPECTROSCOPE

(71) Applicants: NATIONAL UNIVERSITY CORPORATION NAGOYA UNIVERSITY, Nagoya (JP); KOGAKUIN UNIVERSITY, Tokyo (JP)

(72) Inventors: Hideki Tomita, Nagoya (JP); Daiki Matsui, Nagoya (JP); Tetsuo Sakamoto, Tokyo (JP)

(73) Assignees: NATIONAL UNIVERSITY CORPORATION NAGOYA UNIVERSITY, Nagoya (JP); KOGAKUIN UNIVERSITY, Tokyo (JP)

( * ) Notice: Subject to any disclaimer, the term of this patent is extended or adjusted under 35 U.S.C. 154(b) by 0 days.

(21) Appl. No.: 16/487,973

(22) PCT Filed: Feb. 22, 2018

(86) PCT No.: PCT/JP2018/006357
§ 371 (c)(1),
(2) Date: Aug. 22, 2019

(87) PCT Pub. No.: WO2018/155526
PCT Pub. Date: Aug. 30, 2018

(65) Prior Publication Data
US 2020/0136338 A1    Apr. 30, 2020

(30) Foreign Application Priority Data
Feb. 24, 2017 (JP) .................................. 2017-034189

(51) Int. Cl.
*H01S 3/10* (2006.01)
*H01S 3/06* (2006.01)
(Continued)

(52) U.S. Cl.
CPC ............ *H01S 3/0615* (2013.01); *H01J 49/10* (2013.01); *H01S 3/061* (2013.01); *H01S 3/0602* (2013.01);
(Continued)

(58) Field of Classification Search
CPC ...... H01S 3/109; H01S 3/1055; H01S 3/0615; H01S 3/061; H01S 3/0602;
(Continued)

(56) References Cited

U.S. PATENT DOCUMENTS 4,975,918 A * 12/1990 Morton ................. H01S 3/0612
372/20
5,218,609 A * 6/1993 Oda ........................ H01S 3/115
372/10
(Continued)

OTHER PUBLICATIONS

Erdmann et al.; "Resonance and Nonresonant Laser Ionization of Sputtered Uranium Atoms from Thin Films and Single Mircoparticles: Evaluation of a Combined System for Particle Trace Analysis;" Anal. Chem.; 2003; pp. 3175-3181; vol. 75.
(Continued)

*Primary Examiner* — Kinam Park
(74) *Attorney, Agent, or Firm* — Oliff PLC

(57) ABSTRACT

A laser device for laser resonance ionization includes a wavelength variable grating-type titanium-doped sapphire laser and includes a titanium (Ti) doped titanium sapphire crystal disposed within a resonator. The titanium sapphire crystal is fixedly disposed on a stage. The titanium-doped sapphire crystal can be moved in the optical axis direction by the stage, thereby changing the position of the titanium-
(Continued)

doped sapphire crystal. The switching between the wideband mode and the high-output mode can be performed by changing the position of the titanium-doped sapphire crystal.

9 Claims, 8 Drawing Sheets

(51) Int. Cl.
| | |
|---|---|
| *H01J 49/10* | (2006.01) |
| *H01S 3/1055* | (2006.01) |
| *H01S 3/109* | (2006.01) |
| *H01S 3/08* | (2006.01) |
| *H01S 3/081* | (2006.01) |
| *H01S 3/102* | (2006.01) |
| *H01S 3/094* | (2006.01) |
| *H01S 3/16* | (2006.01) |

(52) U.S. Cl.
CPC .......... *H01S 3/0804* (2013.01); *H01S 3/0805* (2013.01); *H01S 3/08009* (2013.01); *H01S 3/0816* (2013.01); *H01S 3/08036* (2013.01); *H01S 3/109* (2013.01); *H01S 3/1024* (2013.01); *H01S 3/10046* (2013.01); *H01S 3/1055* (2013.01); *H01S 3/10069* (2013.01); *H01S 3/094076* (2013.01); *H01S 3/1625* (2013.01); *H01S 3/1636* (2013.01)

(58) Field of Classification Search
CPC .. H01S 3/08009; H01S 3/0805; H01S 3/0816; H01S 3/094076; H01S 3/10046; H01S 3/10069; H01S 3/1024; H01S 3/1625; H01S 3/1636; H01S 3/0804; H01S 3/08086
See application file for complete search history.

(56) References Cited

U.S. PATENT DOCUMENTS

2011/0039685 A1* 2/2011 Mao ................... C04B 35/6263
501/153
2018/0090904 A1* 3/2018 Carre ................... H01S 3/0602

OTHER PUBLICATIONS

Rothe et al.; "A complementary laser system for ISOLDE RILIS;" International Nuclear Physics Conference 2010; Journal of Physics: Conference Series; 2011; pp. 1-6; vol. 312.
May 15, 2018 Search Report issued in Interational Patent Application No. PCT/JP2018/006357.

* cited by examiner

LASER DEVICE, METHOD FOR CONTROLLING LASER DEVICE, AND MASS SPECTROSCOPE

TECHNICAL FIELD

The present disclosure relates to a laser device for laser resonance ionization and to a method for controlling the laser device. Also, the present disclosure relates to a mass analyzing apparatus (mass spectroscope) including a laser device for laser resonance ionization.

BACKGROUND ART

A method for mass analysis through laser resonance ionization is known as a method for super sensitive elemental analysis. Laser resonance ionization is a method for ionizing a target atom via resonance excitation of the target atom by irradiating the atom with laser light having a wavelength (resonance wavelength) corresponding to the difference between two levels among the energy levels of the single atom. Since the energy levels of the single atom are element specific, it is possible to realize selective ionization of an element through a plurality of resonance transitions. Therefore, it is possible to extract particular element ions from a measurement sample containing many types of elements by obtaining single atoms from the sample through resistance heating or application of an ion beam, and ionizing the single atoms through resonance by applying laser light having a resonance wavelength. Further, elemental analysis and isotopic analysis can be performed by counting, by a mass spectrometer, for each mass number.

In particular, a technique of laser resonance ionization—secondary neutral mass spectrometry (resonant laser secondary neutral mass spectrometry) combining selective ionization by laser resonance ionization and micro-region sputtering of an analysis sample by a focused ion beam (FIB) is known as a method which can realize isotopic imaging of a micro-region (Non-patent Document 1).

In the laser resonance ionization—secondary neutral mass spectrometry technique, as a result of sputtering by a focused ion beam irradiation onto the surface of a solid sample, neutral particles such as single atoms or the like are emitted from the sample surface. The secondary sputtered neutral single atoms are irradiated with laser light for resonance ionization so as to ionize only the atoms of an element of interest by selectively exciting the atoms through resonance, and a mass spectrum is obtained using a time-of-flight mass spectrometer. At that time, through raster scanning of the focused ion beam, isotopic imaging which is high in lateral resolution can be attained. In order to realize such imaging, it is essential to obtain a large number of ion counts within a short period of time. Therefore, the focused ion beam and the laser light for resonance ionization which is synchronized therewith must have high repetition rates.

A preferred example of the laser device for laser resonance ionization is a nanosecond pulsed titanium sapphire laser (Non-patent Document 2). This laser can be operated stably for a long period of time and can be used at a high repetition rate. In this nanosecond pulsed titanium sapphire laser, in order to obtain a specific wavelength-variable range, a laser resonator must be formed through use of a mirror with a coating which reflects only light in a particular wavelength range, and therefore, wavelength selection within a short period of time is difficult. Meanwhile, although the grating-type titanium sapphire laser allows quick wavelength selection, this laser has been unable to simply perform switching between a configuration which allows the wavelength to be changed within a broadband and a configuration which enables high output although its wavelength variable range is limited.

In the case where the titanium sapphire laser is applied to the laser resonance ionization—secondary neutral mass spectrometry technique, it is necessary to apply a plurality of pulsed laser beams to the vicinity of an atom source and control their wavelengths, positions, and pulse timings.

In particular, in order to perform measurement a large number of times within a short period of time, highly efficient ionization is mandatory. In order to realize the highly efficient ionization, the wavelength of the titanium sapphire laser must be changed in accordance with an element or isotope to be measured. In view of this, a grating-type titanium sapphire laser which can sweep the laser emission wavelength in a wide range is useful. This is because the grating-type titanium sapphire laser can quickly change the wavelength of the fundamental laser light even when employing a different ionization scheme (a combination of multistep resonance transitions for ionization) in accordance with a target.

A certain ionization scheme may require laser emission which is low in output and falls in a short wavelength range as compared with 800 nm (gain peak) or laser emission within a long wavelength range. Meanwhile, a different ionization scheme may require high intensity laser light whose wavelength is close to 800 nm (gain peak). Therefore, it is necessary to perform switching between a mode which provides a wide wavelength-variable range (wideband mode) and a mode which provides high output near 800 nm (gain peak) (high-output mode) in accordance with the ionization scheme to be used.

PRIOR ART DOCUMENTS

Non-Patent Documents

Non-patent Document 1: N. Erdmann et al., "Resonance and Nonresonant Laser Ionization of Sputtered Uranium Atoms from Thin Films and Single Microparticles: Evaluation of a Combined System for Particle Trace Analysis", Anal. Chem., 75, pp. 3175-3181, (2003)

Non-patent Document 2: S. Rothe, et al., "A complementary laser system for ISOLDE RILIS", Journal of Physics: Conference Series, 312, pp. 052020, (2011)

SUMMARY OF THE INVENTION

Problem to be Solved by the Invention

However, in the conventional grating-type titanium sapphire laser, the switching between the wideband mode and the high-output mode has not been simple.

In view of the above, the present disclosure provides a laser device for laser resonance ionization whose mode can be simply switched between the wideband mode and the high-output mode.

Means for Solving the Problem

The present disclosure discloses a laser device for laser resonance ionization which is wavelength variable and is characterized by comprising:

a resonator including an output mirror and a grating for selecting a wavelength through rotation thereof;

a titanium-doped sapphire crystal disposed within the resonator and serving as a laser medium; and an pumping light source for applying pumping light to the sapphire crystal, wherein the sapphire crystal is movable in an optical axis direction of laser light.

Effects of the Invention

According to the present disclosure, the switching between the wideband mode and the high-output mode can be performed simply.

MODES FOR CARRYING OUT THE INVENTION

Specific embodiments of the laser device of the present disclosure will be described; however, the present disclosure is not limited to the embodiments.

Embodiment 1

Figure 1:
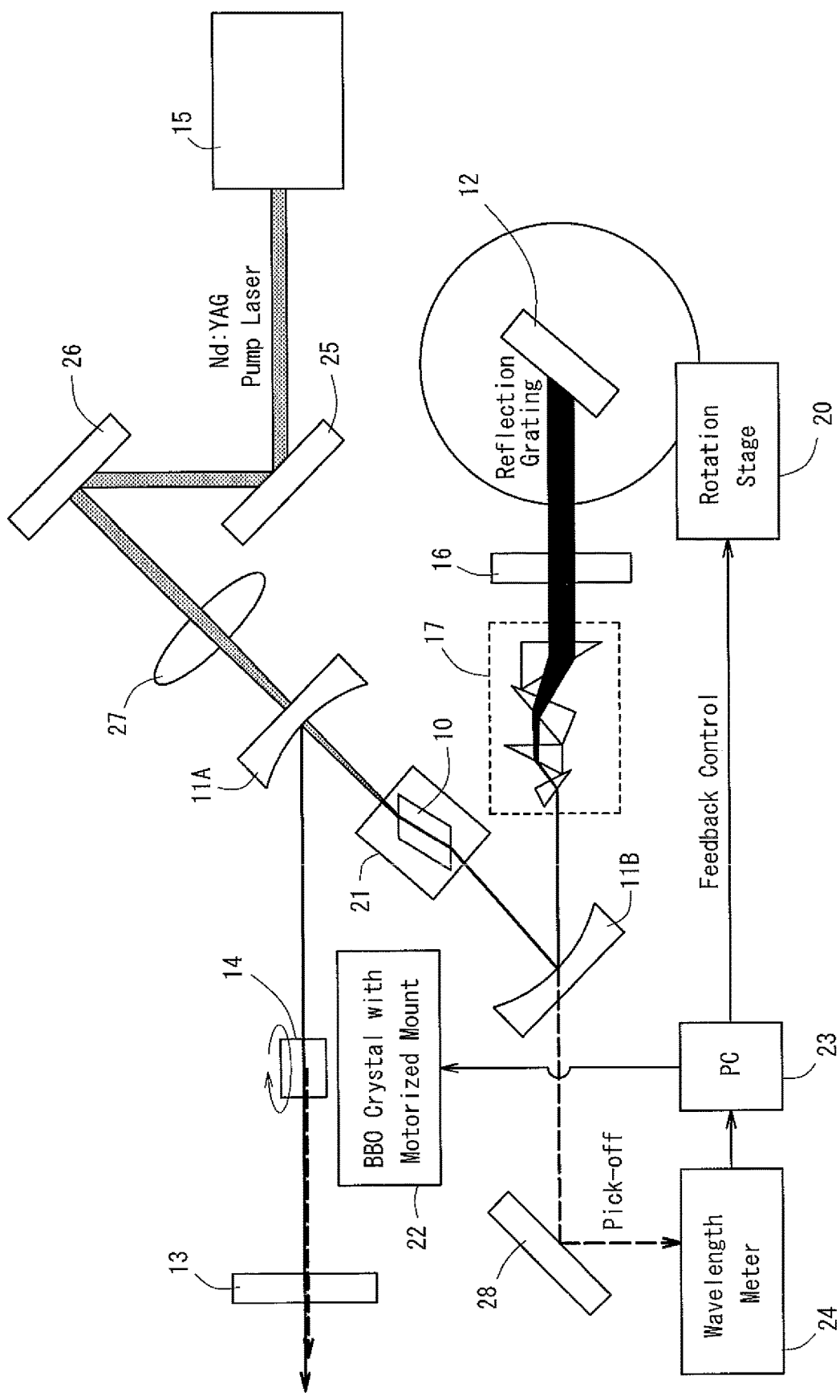
FIG. 1 Diagram showing the structure of a laser device of Embodiment 1.

FIG. 1 is a diagram showing the structure of a laser device of Embodiment 1. The laser device of Embodiment 1 is a wavelength variable grating-type titanium-doped sapphire laser whose wavelength-variable range is wide, which allows selection of the wavelength within a short period of time, which can operate stably for a long period of time, and which can be used at a high repetition rate. Therefore, the laser device of Embodiment 1 is suitable for laser resonance ionization. The laser device of Embodiment 1 includes a titanium-doped sapphire crystal 10 which is a sapphire crystal doped with titanium (Ti), two concave mirrors 11A and 11B, a grating 12, an output mirror 13, a non-linear optical crystal 14, an pumping light source 15, a diaphragm 16, and a prism 17. The output mirror 13, the concave mirrors 11A and 11B, and the grating 12 are disposed in this order in a Z-shaped pattern, thereby constituting a so-called Z-shaped resonator in which the optical axis of light traveling back and forth within the resonator depicts the letter Z.

Regarding the Titanium-Doped Sapphire Crystal 10

The titanium-doped sapphire crystal 10 is a crystal of sapphire ($Al_2O_3$) doped with titanium (Ti). The titanium-doped sapphire crystal 10 is disposed between the two concave mirrors 11A and 11B. The titanium-doped sapphire crystal 10 is a rhombus and has a Brewster-cut incident end surface, and is disposed at the Brewster angle with respect to the optical axis. The titanium-doped sapphire crystal 10 is a laser medium, and laser emission occurs therein upon incidence of pumping light from the pumping light source 15.

The titanium-doped sapphire crystal 10 is fixedly disposed on the stage 21. The stage 21 is disposed near the midpoint between the two concave mirrors 11A and 11B. This stage 21 can move the titanium-doped sapphire crystal 10 in the optical axis direction, thereby changing the position of the titanium-doped sapphire crystal 10. The amount of movement of the titanium-doped sapphire crystal-doped 10 by the stage 21 is controlled by a PC 23. The switching between the wideband mode and the high-output mode can be performed simply by changing the position of the titanium-doped sapphire crystal 10.

In the high-output mode, the range in which the wavelength of laser light can be changed is narrow although high output is provided near 800 nm (gain peak). In the wideband mode, the range in which the wavelength of laser light can be changed is wide although the output is lower than the output in the high-output mode.

A conceivable reason why such mode selection becomes possible is that, within the resonator, the gain of laser emission and the number of photons change depending on the manner of overlapping between excitation light and modes of light. In the case where the titanium-doped sapphire crystal 10 is disposed near the midpoint between the concave mirrors 11A and 11B, both the light traveling back and forth within the resonator and the excitation light enter the titanium-doped sapphire crystal 10 while overlapping in a state in which they have been narrowly concentrated. Therefore, the photon density in a stimulated emission region becomes high, the gain increases, the wavelength-variable range becomes wide, and the emission timing becomes early.

Meanwhile, in the case where the titanium-doped sapphire crystal 10 is located away from the midpoint between the concave mirrors 11A and 11B, the widths of the pumping light and the light traveling back and forth within the resonator increase and the photon density decreases as compared with the case where the titanium-doped sapphire crystal 10 is located at the midpoint. Therefore, high gain cannot be obtained, the wavelength-variable range becomes narrow, and the laser emission timing becomes later. However, since the stimulated emission region becomes wide, the output increases as compared with the case where the titanium-doped sapphire crystal 10 is located at the midpoint between the concave mirrors 11A and 11B. For the above-described reasons, the wideband mode and the high-output mode can be selected by changing the position of the titanium-doped sapphire crystal 10 in the optical axis direction.

For the above-described reasons, it is considered that changes in the wavelength-variable range and the output with the change in the position of the titanium-doped sapphire crystal 10 in the optical axis direction can be adjusted by design of, for example, the focal distances of the concave mirrors 11A and 11B, the distance between the concave mirrors 11A and 11B, and the focal distance for condensation of the pumping light.

Notably, the method of changing the position of the titanium-doped sapphire crystal 10 is not limited to the above-described method of moving the titanium-doped sapphire crystal 10 by moving the stage 21 on which the titanium-doped sapphire crystal 10 is disposed, and the position of the titanium-doped sapphire crystal 10 may be changed by an arbitrary method.

Also, the wideband mode and the high-output mode differ in emission timing (which is the time between the point in time when the excitation light is supplied into the resonator and the point in time when laser emission starts), and, in the high-output mode, the emission timing tends to become late as compared with the wideband mode. Accordingly, in the case where the time synchronization of laser light is established among a plurality of laser devices of Embodiment 1, changes of the emission timing with mode changes must be taken into consideration.

Regarding the Concave Mirrors 11A and 11B

Each of the two concave mirrors 11A and 11B has a concave surface on one side and a flat surface on the other side. The two concave mirrors 11A and 11B are disposed such that the titanium-doped sapphire crystal 10 is located between the mirrors 11A and 11B and the concave surfaces of the mirrors 11A and 11B face each other. The concave mirrors 11A and 11B are disposed at positions corresponding to the bending points of the Z-shaped resonator structure and their angles are adjusted such that the optical axis depicts the letter Z due to reflection by the concave surfaces of the concave mirrors 11A and 11B. The distance between the concave mirrors 11A and 11B and the curvatures of the concave surfaces are set such that the beam diameter becomes the smallest at the midpoint between the concave mirrors 11A and 11B.

The concave mirror 11A is designed to transmit the excitation light (whose wavelength is 532 nm) and reflect light within the wavelength band of the fundamental laser light (710 to 940 nm). The concave mirror 11B is designed to reflect the greater part of laser light within the wavelength band of the fundamental laser light and partially transmit the laser light. The laser light having passed through the concave mirror 11B is led to a wavelength meter 24 through a mirror 28.

Regarding the Grating 12

The grating 12 is disposed at a position corresponding to one end of the Z-shaped resonator structure. The grating 12 is fixedly disposed on a rotation stage 20. The grating 12 can be rotated by the rotation stage 20, and the angle of the grating 12 with respect to the optical axis can be controlled by the rotation. Wavelength selection can be performed through wavelength dispersion by changing the incident angle of laser light to the grating 12 through rotation of the grating 12. More specifically, the grating 12 is a transmission type and constitutes a resonator which allows wavelength selection through wavelength dispersion. In this resonator, first-order diffracted light passing through the grating 12 is reflected by a mirror (not illustrated) and is caused to enter the grating 12 again. Notably, instead of a transmission-type grating, a reflection-type grating may be used as the grating 12.

The rotational angle of the grating 12 (i.e., the angle of the incidence surface of the grating 12 with respect to the optical axis) is controlled by the PC 23 and is feedback controlled as follows. The greater part of the light (the fundamental laser light) reflected by the grating 12 and reaching the concave mirror 11B is reflected, but a part of the light passes through the concave mirror 11B and is taken out to the outside of the resonator. The taken out fundamental laser light is reflected by the mirror 28 and is led to the wavelength meter 24. The wavelength of the fundamental is measured by the wavelength meter 24. Data representing the measured wavelength is sent to the PC 23. The PC 23 produces a control signal for controlling the rotation stage 20 on the basis of the difference between the measured wavelength of the fundamental laser light and a desired wavelength of the fundamental laser light. The rotation stage 20 controls the rotational angle of the grating 12 on the basis of the control signal. In this manner, the rotational angle of the grating 12 is feedback-controlled such that the wavelength of the fundamental laser light coincides with the desired wavelength.

Regarding the Output Mirror 13

The output mirror 13 is a dichroic mirror disposed at a position corresponding to the other end of the Z-shaped resonator structure. The output mirror 13 totally reflects the fundamental laser light (in a wavelength band near 800 nm). The output mirror 13 transmits a portion of the second harmonic generated by the non-linear optical crystal 14 (in a wavelength band near 400 nm) and reflects the remaining part of the second harmonic. The second harmonic having passed through the output mirror 13 is the laser output. The reflection characteristics of the output mirror 13 are such that it has a reflectance of 99.9% for the fundamental whose wavelength is 710 to 940 nm and a reflectance of 3% for the second harmonic wave whose wavelength is 360 to 420 nm.

Notably, in Embodiment 1, the Z-shaped resonator structure is used; i.e., the output mirror 13, the concave mirrors 11A and 11B, the grating 12 are disposed in this order such that the optical axis forms a Z-like shape. However, the resonator structure is not limited thereto, and any of conventionally known resonator structures such as a bow-tie-type resonator structure may be employed. Also, in Embodiment 1, the resonator structure is of a symmetric confocal type; however, the resonator structure may be of an asymmetric type or a hemispherical surface type.

Regarding the Non-Linear Optical Crystal 14

The non-linear optical crystal 14 is disposed in the resonator to be located between the output mirror 13 and the concave mirror 11A. The non-linear optical crystal 14 is a crystal of barium borate (BBO). The non-linear optical crystal 14 is a cuboid crystal cut such that the crystalline axis coincides with a phase matching angle. The fundamental laser light reflected by the concave mirror 11A enters the non-linear optical crystal 14. A portion of the fundamental laser light having entered the non-linear optical crystal 14 is converted to light (second harmonic) whose frequency is two times the fundamental frequency and which is output from the non-linear optical crystal 14. The greater part of the second harmonic passes through the output mirror 13 and is taken out as the output of the laser device of Embodiment 1.

Since the non-linear optical crystal 14 is disposed within the resonator as described above, as compared with the case where the second harmonic is produced by disposing the non-linear optical crystal 14 externally of the resonator, a change in beam position when the wavelength of the second harmonic is changed (in other words, a change in the direction of radiation of the second harmonic) can be suppressed. Also, the fundamental laser light not converted by the non-linear optical crystal 14 again travels back and forth within the resonator without being taken out. Therefore, the fundamental laser light not converted by the non-linear optical crystal 14 does not become useless, and efficient laser emission is possible.

Notably, use of the non-linear optical crystal 14 is not mandatory. However, in many cases, the resonance wavelength is shorter than the fundamental wavelength of the laser. Therefore, as in Embodiment 1, the non-linear optical crystal 14 is generally used so as to convert the fundamental laser light to a second harmonic having a shorter wavelength to be used for resonance ionization.

In Embodiment 1, the second harmonic generated by the non-linear optical crystal 14 is utilized. However, a higher-order harmonic may be utilized. In Embodiment 1, a crystal of BBO is used as the non-linear optical crystal 14. However, any of various non-linear optical crystals such as LBO, KTP, and BiBO may be used.

The non-linear optical crystal 14 is fixedly attached to a mount 22. The non-linear optical crystal 14 can be rotated by the mount 22, and therefore, the rotational angle of the non-linear optical crystal 14 (i.e., the angle of an incident surface of the non-linear optical crystal 14 with respect to the optical axis) can be changed. Its rotation axis is perpendicular to the optical axis and the rotation axis of the grating 12.

The non-linear optical crystal 14 is rendered rotatable for the following reason. When the wavelength of the second harmonic is changed by rotating the grating 12, a variation arises in the output of the second harmonic. This is because the phase matching angle of the non-linear optical crystal 14 depends on the wavelength of the fundamental laser light. In view of this, preferably, the non-linear optical crystal 14 is rotated by the mount 22 in accordance with the fundamental wavelength (namely, in accordance with the rotational angle of the grating 12) so as to calibrate the variation of the output of the second harmonic. The calibration is preferably performed as follows. A calibration curve representing the relation between the wavelength of the second harmonic and the rotational angle of the non-linear optical crystal 14 at which the output of the second harmonic becomes the maximum is obtained in advance, and the calibration is performed on the basis of the calibration curve. Needless to say, it is possible to use a calibration curve representing the relation between the fundamental wavelength and the rotational angle of the non-linear optical crystal 14 or a calibration curve representing the relation between the rotational angle of the grating 12 and the rotational angle of the non-linear optical crystal 14. Namely, the calibration curve may be any calibration curve which represents the relation between a parameter relating to the wavelength of the second harmonic and the rotational angle of the non-linear optical crystal 14.

For example, data representing the calibration curve are stored in the PC 23 in advance. The PC 23 obtains the rotational angle of the non-linear optical crystal 14 from the calibration curve and the fundamental wavelength measured by the wavelength meter 24. The PC 23 then produces, on the basis of the rotational angle, a control signal for controlling the mount 22. The mount 22 controls the rotational angle of the non-linear optical crystal 14 on the basis of the control signal. As a result, the rotational angle of the non-linear optical crystal 14 can be controlled such that the position of the beam is maintained constant irrespective of the change of the second harmonic, and the variation of the output of the second harmonic can be suppressed.

More specifically, the calibration curve is produced by measuring, at several wavelengths of the second harmonic, the rotational angle of the non-linear optical crystal 14 at which the output of the second harmonic becomes the maximum, and approximating the measurement points by using a polynomial function or the like. The approximation curve is preferably a third or higher order polynomial function. The variation of the second harmonic output can be suppressed further. However, when the order of the polynomial function is excessively high, the variation of the output may increase. Therefore, use of a fifth or lower order polynomial function is preferred.

The calibration curve is not limited to that obtained through approximation by a third or higher order polynomial function and may be a calibration curve obtained through approximation by a quadratic function. In this case, the variation of the output becomes larger as compared with the case where approximation is performed by using a third or higher order polynomial function. Also, measurement data may be divided into a plurality of measurement data sets corresponding to wavelength ranges, and the approximation by the quadratic function may be performed for each of the measurement data sets. In this case, although the variation of the output becomes larger as compared with the case where approximation is performed by using a third or higher order polynomial function, the variation of the output becomes smaller as compared with the case where approximation is merely performed by using a quadratic function. The spacing between the measurement points used for creation of the calibration curve is preferably a spacing corresponding to a wavelength of 5 nm or less.

Regarding the Pumping Light Source 15

The pumping light source 15 is a second harmonic of an Nd:YAG laser, whose wavelength is 532 nm, whose repetition frequency is 10 kHz, and whose output is 16 W is used as the pumping light. The pumping light is reflected by two mirrors 25 and 26 such that the optical axis extends in a predetermined direction, and is then focused by a lens 27. The focused pumping light impinges on the flat surface of the concave mirror 11A on the side opposite the concave surface side. The condensed pumping light passes through the concave mirror 11A and enters the resonator. The pumping light is focused such that the beam diameter becomes the smallest at the midpoint between the concave mirrors 11A and 11B.

Notably, a laser other than the Nd:YAG laser may be used as the pumping light source 15. For example, an Nd:YLF laser, an Nd:YVO4 laser, or the like may be used. Alternatively, direct pumping by a semiconductor diode laser may be used. The desired characteristics of the pumping light are as follows. It is preferred that the wavelength is 450 to 600 nm, the repetition frequency is 1 to 30 kHz, the pulse width is 20 to 300 ns, and the peak output is 1 to 3 mJ/pulse.

Regarding the Prism 17

The prism 17 is an anamorphic prism formed by combining a plurality of prisms and is disposed between the concave mirror 11B and the grating 12. This prism 17 expands the beam diameter of light traveling from the titanium-doped sapphire crystal 10 and reflected by the concave mirror 11B. In contrast, the prism 17 reduces the beam diameter of light from the grating 12. Since the degree of wavelength dispersion by the grating 12 is increased by expanding the beam diameter in this manner, the wavelength selection by the grating 12 and the control of beam transmission by the diaphragm 16 are facilitated.

Regarding the Diaphragm 16

The diaphragm 16 is disposed in the resonator to be located between the prism 17 and the grating 12. The diaphragm 16 is an iris diaphragm (iris). The diaphragm 16 can control the diameter of a circular aperture, without changing the center, by changing the degree of overlapping of a plurality of diaphragm blades, thereby restricting the light beam passage region within the resonator (restricts the transverse mode).

By restricting the transverse mode of light within the resonator by controlling the diameter of the aperture by the diaphragm 16, the spectral band width of laser light can be controlled, because the light within the resonator has a wavelength distribution in a plane perpendicular to the optical axis. Namely, when the light passage region is narrowed by narrowing the aperture of the diaphragm 16; i.e., the transverse mode of light within the resonator is restricted, the wavelength distribution in the plane perpendicular to the optical axis becomes narrow, and the spectral band width becomes narrow.

Also, the emission timing can be controlled by controlling the diameter of the aperture by the diaphragm 16. Accordingly, the time synchronization of laser light can be easily established among a plurality of laser devices of Embodiment 1.

Notably, in Embodiment 1, an iris diaphragm is used as the diaphragm 16. However, a diaphragm mechanism of an arbitrary scheme may be used so long as the employed mechanism can limit the passage region in the width direction of the beam.

Preferred Characteristics of Laser Light

For highly efficient ionization, the laser light output from the laser device of Embodiment 1 desirably has the following characteristics. The laser light desirably has a repetition frequency of 1 to 30 kHz and a pulse width of 20 to 100 ns. In the wideband mode, the wavelength-variable range is desirably 700 to 920 nm, and the peak output is desirably 0.001 to 0.5 mJ/pulse. In the high-output mode, the wavelength-variable range is desirably 750 to 830 nm, and the output desirably becomes 1.2 times or more the output in the wideband mode near 800 nm (gain peak).

As described above, the laser device of Embodiment 1 achieves very excellent effects as a laser device for laser resonance ionization. The effects are as follows.

First, the switching between the wideband mode and the high-output mode can be performed simply and easily by controlling the position of the titanium-doped sapphire crystal 10 in the optical axis direction.

In the case of laser resonance ionization, for highly efficient ionization, the switching between the wideband mode (which provides a wide wavelength-variable range) and the high-output mode (which provides a high output near the gain peak) must be performed in accordance with an ionization scheme to be used. In the laser device of Embodiment 1, since the switching between the wideband mode and the high-output mode can be performed simply, a wide range of ionization schemes can be selectively used. Therefore, it is possible to highly efficiently ionize an element or isotope of interest.

Second, since the non-linear optical crystal 14 is disposed within the resonator, the variation of the beam position of the output laser light can be suppressed. It is possible to efficiently perform laser resonance ionization by synchronizing a plurality of laser devices of Embodiment 1. Also, since the non-linear optical crystal 14 is rotated in response to rotation of the grating 12, the variation of the output of the second harmonic can be suppressed.

For highly efficient ionization, it is required to use in combination the fundamental output from a grating-type titanium-doped sapphire laser and the second harmonic of the light. In the case of a conventional grating-type titanium-doped sapphire laser, the fundamental output therefrom is focused onto a non-linear optical crystal outside the laser resonator, and phase matching is achieved by precisely adjusting the beam path of the fundamental laser light with respect to the crystal axis of the non-linear optical crystal, whereby the second harmonic output is obtained.

However, in the case where this is applied to a wavelength variable laser, the beam path of the fundamental wave must be adjusted in accordance with the wavelength, and there arises a problem that the output direction of the second harmonic greatly changes with the wavelength. In the case where imaging of an element of interest in a sample is performed by the laser resonance ionization—secondary neutral mass spectrometry, the above-mentioned beam position change makes the synchronization of laser light irradiation positions difficult, thereby deteriorating accuracy.

In view of the above, in the laser device of Embodiment 1, the non-linear optical crystal 14 is disposed within the resonator. As a result, it is possible to suppress the beam position change which occurs when the wavelength of the second harmonic is changed. Also, the output variation occurring when the wavelength of the second harmonic is changed can be suppressed by controlling the rotational angle of the non-linear optical crystal 14 in response to rotation of the grating 12. As a result, in the case where a target element is ionized by two or more laser light beams having different wavelengths by using a plurality of laser devices of Embodiment 1, synchronization of the irradiation positions of the laser devices becomes easy, and ionization can be performed more efficiently.

Third, the half width of the emission spectrum of the laser can be controlled by disposing the diaphragm 16 within the resonator and controlling the aperture of the diaphragm 16. As a result, the ionization efficiency and the sensitivity for each isotope can be improved.

Neutral atoms sputtered by an ion beam may have an energy of about several eV in some cases, and the range of resonance wavelength expands due to the Doppler effect. Meanwhile, the energy levels of an atom slightly differ between isotopes due to isotope shift and hyperfine splitting, and a difference of several tens MHz to several GHz is present between the isotopes. There has been a problem that due to overlapping of the spectral broadening of laser light and these, a difference is produced in ionization efficiency and sensitivity between isotopes. In order to solve such a problem, the spectral band-width of laser light must be controlled in accordance with the velocity spread of an atom serving as a target or the difference between isotopes. Conventionally, this has been controlled by, for example, inserting an etalon. However, the conventional method requires a lot of time and effort, and therefore, a method for simply controlling the spectral band-width has been desired.

In the laser device of Embodiment 1, the spectral band width of laser light can be controlled simply by merely controlling the diameter of the aperture, through which the laser light passes, by the diaphragm 16. Therefore, an optimal spectral band width corresponding to the velocity spread of the target atom can be selected, and ionization can be performed efficiently. Also, the sensitivity for each isotope can be improved by controlling the spectral band width, whereby the accuracy of isotope identification can be improved.

Notably, the laser device of Embodiment 1 can be used not only for laser resonance ionization of atoms but also for ionization of molecules.

Next, the results of various experiments performed for the laser device of Embodiment 1 will be described.

Experiment 1

Figure 2:
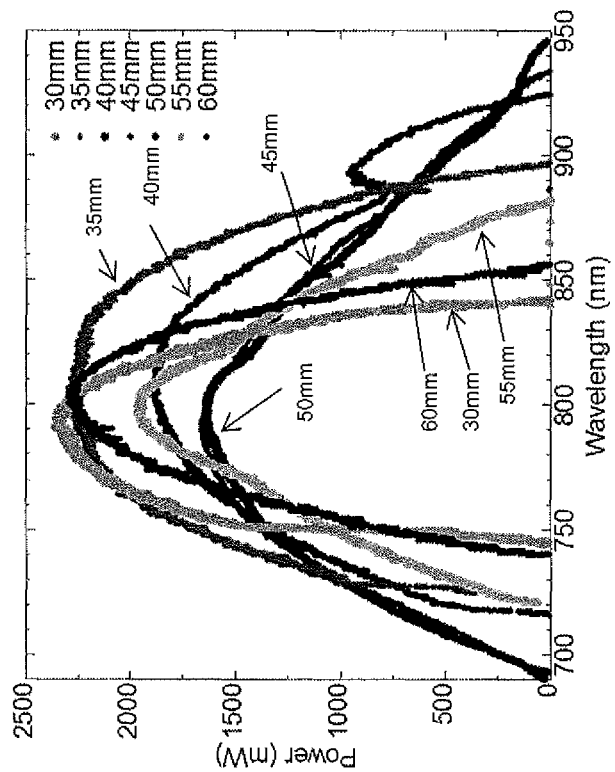
FIG. 2 Graphs each showing the relation between the wavelength and output of the fundamental laser light.
Figure 2:
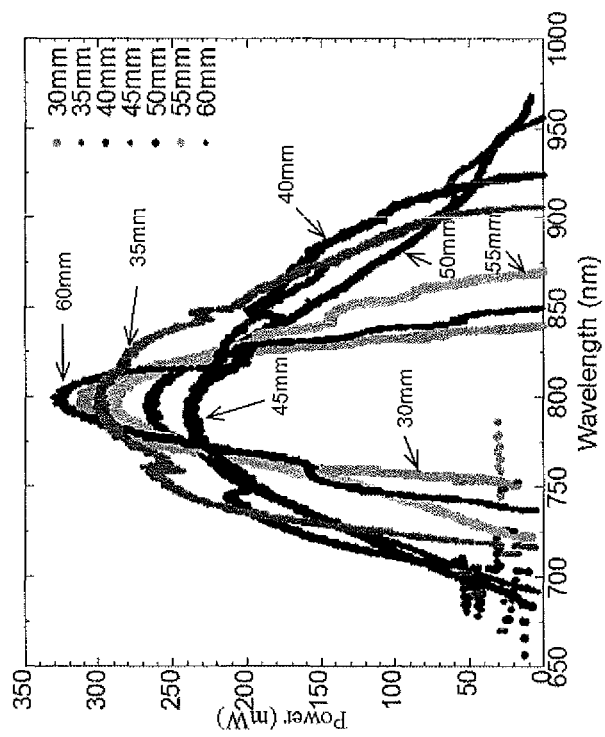

There was investigated how the wavelength variable range and output of laser light change when the distance in the optical axis direction from the concave mirror 11 to the titanium-doped sapphire crystal 10 is changed. Notably, the measurement was performed for the fundamental laser light by removing the non-linear optical crystal 14 from the laser device of Embodiment 1. As a result, the results shown by the graphs of FIG. 2 were obtained. In FIG. 2, the horizontal axis represents the peak wavelength, and the vertical axis represents the output. FIG. 2(a) shows the relation between the peak wavelength and the output in the case where the repetition frequency of the pumping light is 1 kHz, and FIG. 2(b) shows the relation between the peak wavelength and the output in the case where the repetition frequency of the pumping light is 10 kHz. The distance from the concave mirror 11A to the titanium-doped sapphire crystal 10 was changed by 5 mm each time within the range of 30 to 60 mm. When the distance from the concave mirror 11A to the titanium-doped sapphire crystal 10 is 45 mm, the titanium-doped sapphire crystal 10 is located at the midpoint between the two concave mirrors 11.

It was found that, as shown in FIG. 2, when the position of the titanium-doped sapphire crystal 10 in the optical axis direction is changed, the width of the wavelength variable range and the output change. It was found that, when the titanium-doped sapphire crystal 10 is located at the midpoint between the two concave mirrors 11A and 11B, although the output near the gain peak (800 nm) decreases, the width of the wavelength variable range increases; namely, the laser device operates in the wideband mode. Also, it was found that, as the position of the titanium-doped sapphire crystal 10 deviates from the midpoint between the two concave mirrors 11, the width of the wavelength variable range decreases and the output near the gain peak increases; namely, the laser device operates in the high-output mode. As described above, it was found that the switching between the wideband mode and the high-output mode can be performed by controlling the position of the titanium-doped sapphire crystal 10 in the optical axis direction. Also, it was found from the comparison between FIG. 2(a) and FIG. 2(b) that when the repetition frequency increases, the wavelength-variable range tends to expand.

Experiment 2

Figure 3:
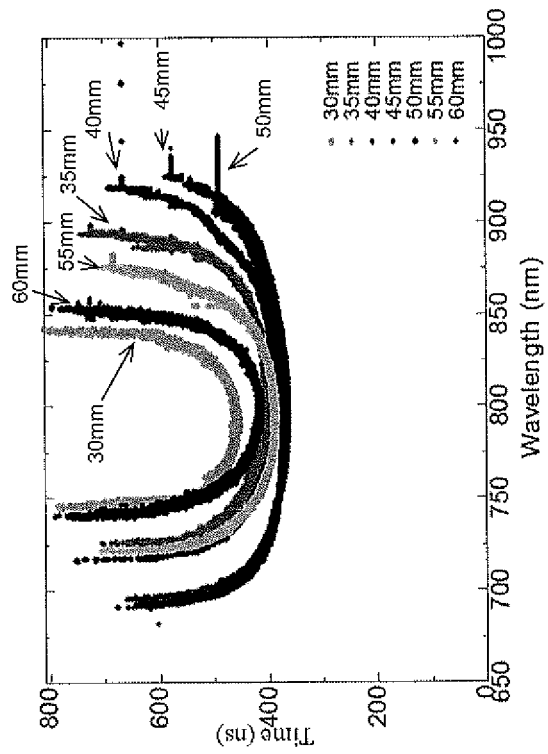
FIG. 3 Graphs each showing the relation between the wavelength and laser timing of the fundamental laser light.
Figure 3:
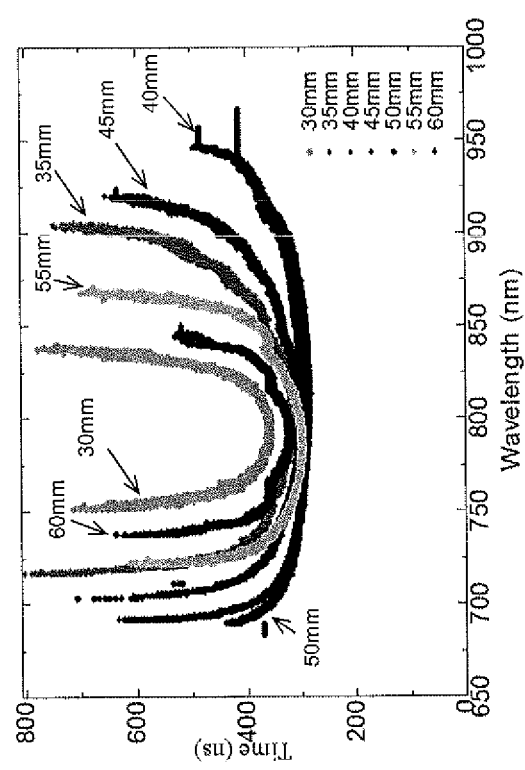

Next, there was investigated how the emission timing changes as a result of the mode switching. In FIG. 3, the horizontal axis represents the peak wavelength of the fundamental laser light, and the vertical axis represents the emission timing. The emission timing is the time between a point in time when the pumping light is supplied into the resonator and a point in time when laser emission starts. FIG. 3(a) shows the relation between the peak wavelength and the emission timing in the case where the repetition frequency is 1 kHz, and FIG. 3(b) shows the relation between the peak wavelength and the emission timing in the case where the repetition frequency is 10 kHz.

It was found that, as shown in FIG. 3, as the wavelength deviates from 800 nm (gain peak), the emission timing delays. Also, it was found that, in the wideband mode, a wavelength change causes a relatively gradual change in the emission timing, and, in high-output mode, a wavelength change causes an abrupt change in the emission timing. Since the emission timing changes as a result of the switching between the wideband mode and the high-output mode as described above, when time synchronization is established among the outputs of a plurality of laser devices of Embodiment 1, the difference in mode must also be taken into consideration.

Experiment 3

Figure 4:
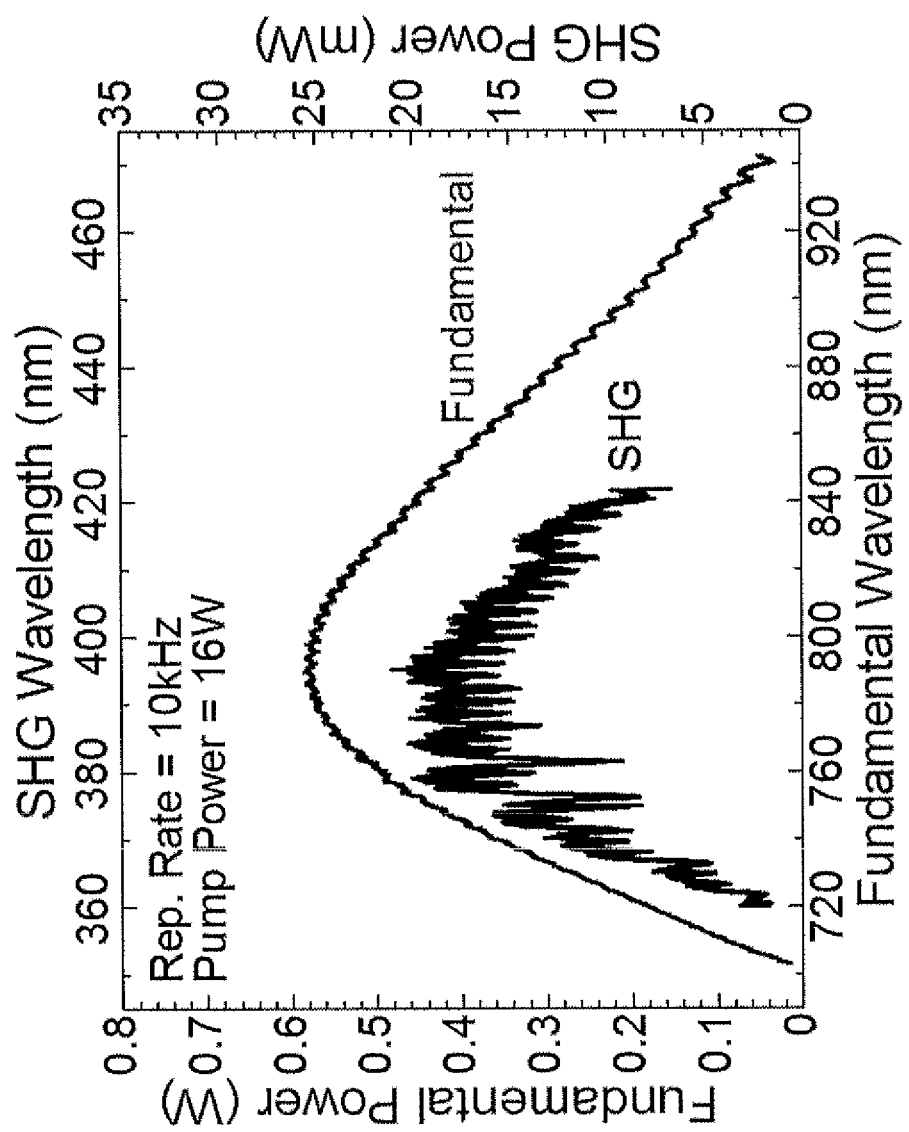
FIG. 4 Graph showing the relation between the wavelength and output of the fundamental laser light and the relation between the wavelength and output of the second harmonic.

FIG. 4 is a graph showing the relation between the wavelength and output of the fundamental laser light and the relation between the wavelength and output of the second harmonic. The mode was set to the wideband mode by moving the titanium-doped sapphire crystal 10 to the midpoint between the concave mirrors 11A and 11B. As shown in FIG. 4, the fundamental wavelength can be changed continuously from 710 nm to 940 nm, and the wavelength of the second harmonic can be changed continuously from 360 nm to 420 nm. From this, it was confirmed that a wide wavelength-variable range was realized.

Experiment 4

The mode was set to the wideband mode by moving the titanium-doped sapphire crystal 10 to the midpoint between the concave mirrors 11A and 11B, and the second harmonic output from the laser device of Embodiment 1 was reflected by a mirror, focused by a lens, and projected onto a screen. The flying distance of laser light from the laser device to the screen via the mirror was set to 4 m, and the distance between the mirror and the screen was set to 58 cm. The screen has a grating-like scale having divisions of 0.5 mm. The wavelength of the second harmonic was changed from 360 nm to 420 nm at a wavelength sweep rate of 30 nm/min, and the screen was photographed by a camera, and a time-course change in the beam position projected onto the screen was observed. As a result, it was found that the beam diameter of laser light on the screen is 0.3 mm, and a change in the beam position is 0.5 mm or less. From this, it was found that, by disposing the non-linear optical crystal 14 within the resonator, the beam position change occurring when the wavelength of the second harmonic is changed can be suppressed.

Experiment 5

Figure 5:
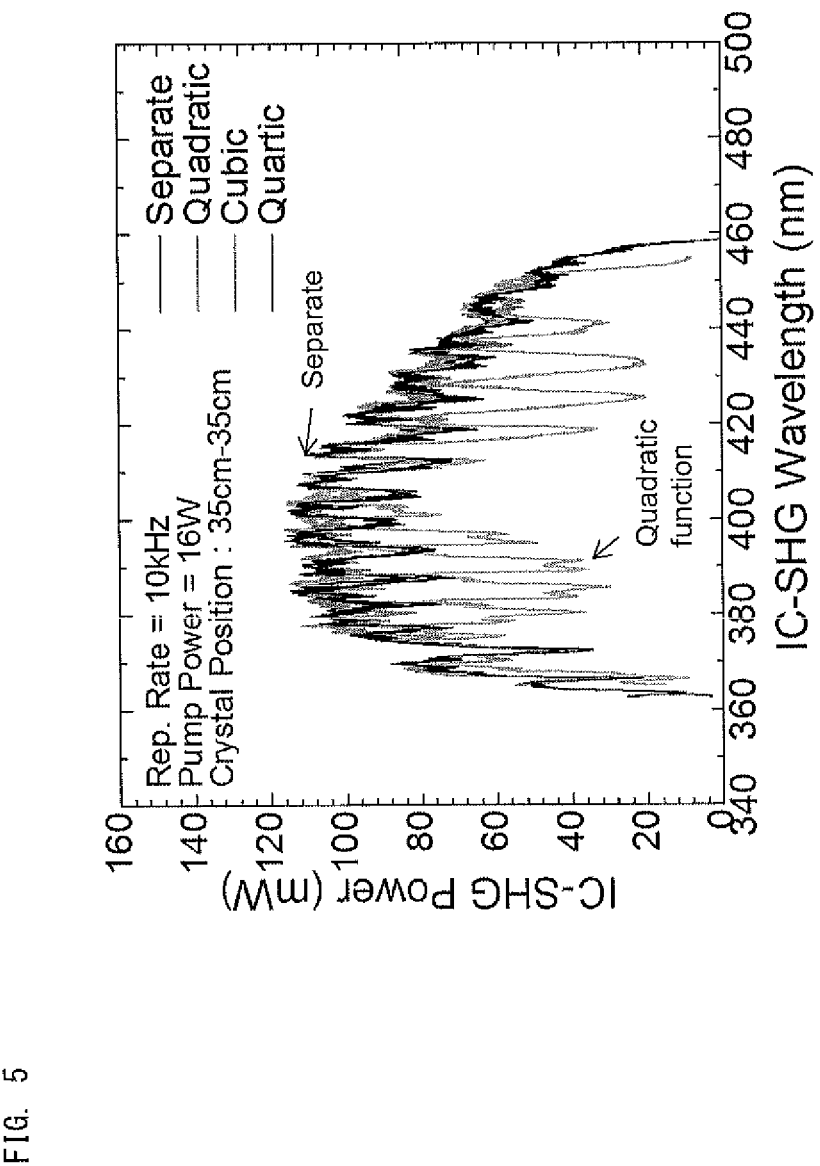
FIG. 5 Graph showing the relation between the wavelength and output of the second harmonic.

The degree of variation of the second harmonic output was investigated while the calibration function used for controlling the rotational angle of the non-linear optical crystal 14 was changed. FIG. 5 is a graph showing the relation between the wavelength and output of the second harmonic. The mode was set to the high-output mode by moving the titanium-doped sapphire crystal 10 to a position 35 cm away from the concave mirror 11A. Calibration curves obtained through approximation using a quadratic function, a cubic function, and a quartic function, respectively, were selectively used as the calibration function. Also, there was used a curve obtained by dividing the wavelength range into a plurality of sections at intervals corresponding to a wavelength of 2 nm, and performing calibration for each section by using a quadratic function (the obtained curve is denoted by "Separate" in FIG. 5).

It was found that, as shown in FIG. 5, in the case where calibration is performed by using a quadratic function, the variation of the output can be suppressed to about 60%. In the case where calibration was performed by using a cubic function or a quartic function, the variation of the output was suppressed further. In this case, the variation of the output was 20% or less. Also, in the case where the wavelength region was divided and approximation was performed by using a quadratic function, the output variation was also about 20%, but a large fluctuation was also observed. As a result, it was found that the calibration function is preferably approximated by using a third or higher-order polynomial function.

Experiment 6

In order to show that the half width of the emission spectrum of the laser (the spectral band width) can be controlled by the aperture of the diaphragm 16, the relation between the wavelength of the fundamental laser light and the spectral band width was investigated for the case where the diaphragm 16 was open and the case where the diaphragm 16 was closed. The titanium-doped sapphire crystal 10 was positioned at the midpoint between the concave mirrors 11A and 11B. In the state in which the diaphragm 16 is open, the diameter of the aperture is 10 mm, and, in the state in which the diaphragm 16 is closed, the diameter of the aperture is 1 mm.

Figure 6:
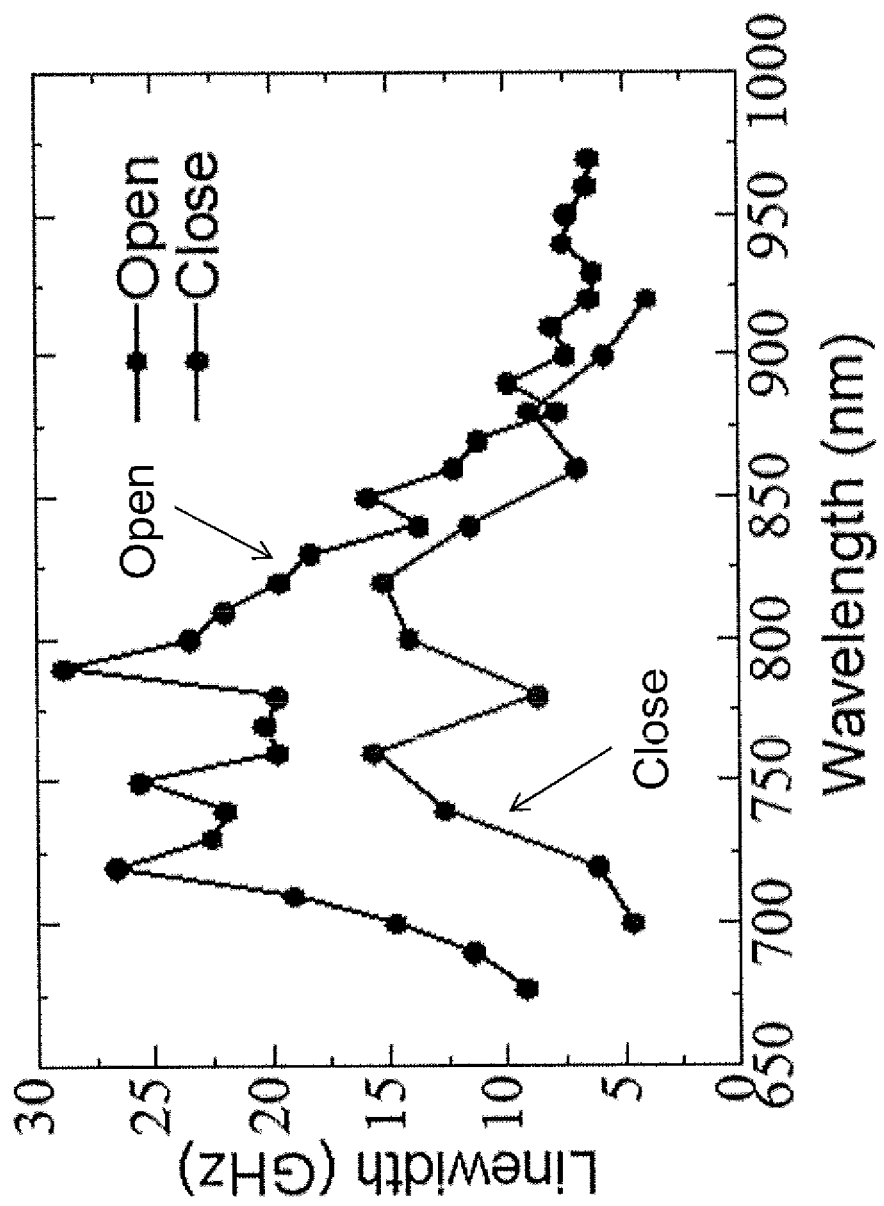
FIG. 6 Graph showing the relation between the wavelength and spectral band width of the fundamental laser light.

FIG. 6 is a graph showing the relation between the wavelength of the fundamental laser light and the spectral band width (the full width at half maximum). As shown in FIG. 6, in the wavelength range of 700 to 925 nm, the spectral band width in the state in which the diaphragm 16 is closed is narrower than the spectral band width in the state in which the diaphragm 16 is open. Notably, in Experiment 6, the diaphragm 16 was adjusted between two states (open and closed states). However, it is thought that the spectral band width can be changed continuously by changing the diameter of the aperture of the diaphragm 16 continuously.

Experiment 7

In the laser device of Embodiment 1, the position of the titanium-doped sapphire crystal 10 was set to the midpoint between the concave mirrors 11A and 11B; i.e., the operation mode was set to the wideband mode. The laser light from the laser device of the Embodiment 1 was applied to Th (thorium) emitted from an atom source, and Th+ produced as a result of ionization was measured by using a TOF mass spectrometer. The wavelength of laser light was swept (changed) from 370 nm to 430 nm. Notably, the ionization potential of Th is 50867 cm−1, and Th is ionized through resonance excitation at 1 wavelength.

Figure 7:
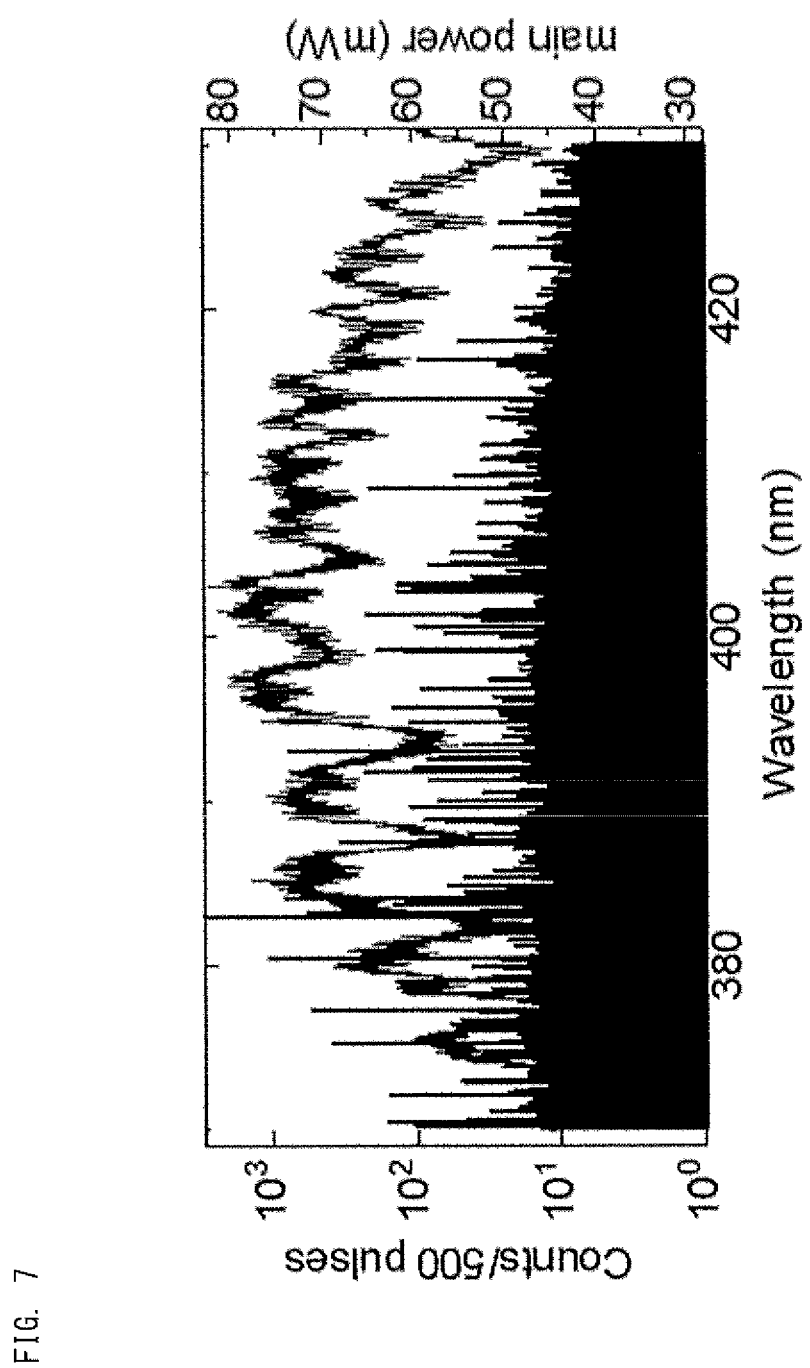
FIG. 7 Graph showing the relation between the wavelength of laser light and the count number of Th ions by a TOF mass spectrometer.

FIG. 7 shows the relation between the wavelength of laser light and the count number of Th ions by a TOF mass spectrometer. Also, the relation between the wavelength and output of laser light is shown in FIG. 7. It was found that, as shown in FIG. 7, the count number of Th ions has a large number of very narrow peaks. This shows the resonance wavelengths of transitions relating to the excitation level of Th. Accordingly, it was found that the laser device of Embodiment 1 can excite Th atoms selectively to a desired intermediate level and can highly efficiently ionize Th atoms by any of various ionization schemes.

Embodiment 2

Figure 8:
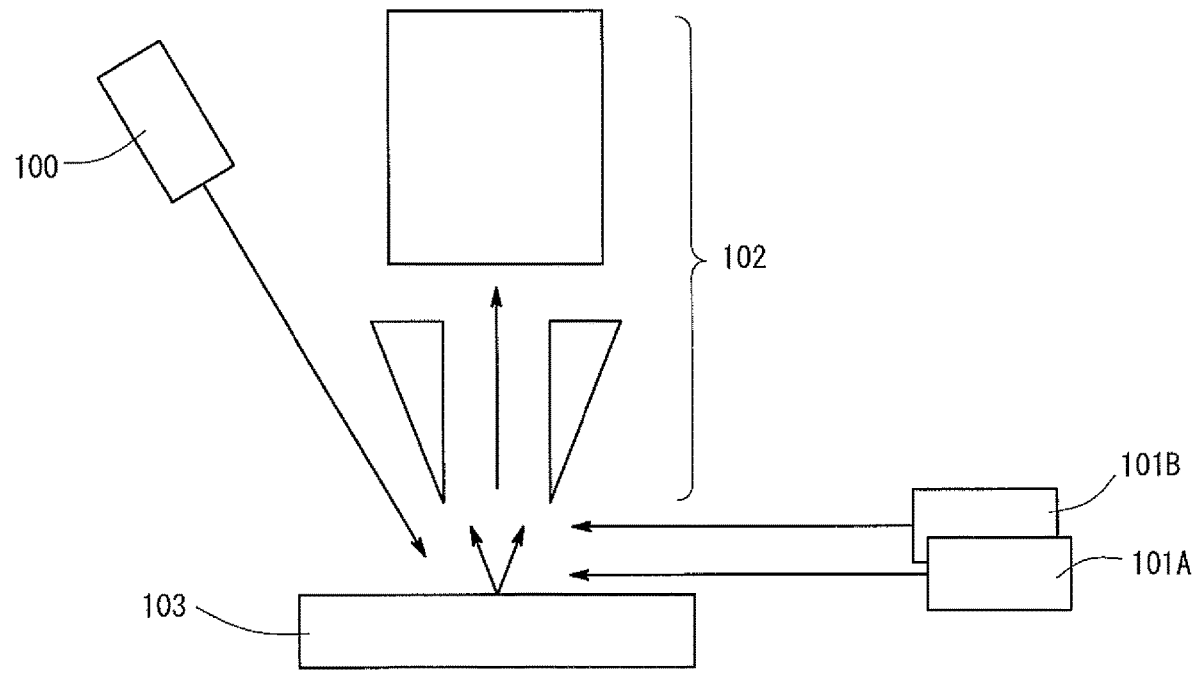
FIG. 8 Diagram showing the structure of a mass analyzing apparatus of Embodiment 2.

FIG. 8 is a diagram showing the structure of a mass analyzing apparatus of Embodiment 2. As shown in FIG. 8, the mass analyzing apparatus of Embodiment 2 includes a focused ion beam source 100, laser devices 101A and 101B for laser resonance ionization, and a TOF mass spectrometer 102.

The focused ion beam source 100 is a device for applying a focused ion beam onto the surface of a sample 103. The focused ion beam source 100 takes out an ion beam from, for example, a gallium ion source composed of liquid metal gallium through an extraction electrode, focuses the ion beam by using an electrostatic lens, and applies the focused ion beam to the surface of the sample 103. The irradiation position of the focused ion beam on the surface of the sample 103 can be scanned (changed) two-dimensionally. When the focused ion beam is applied to the surface of the sample 103, the surface of the sample 103 is sputtered. Namely, neutral atoms forming the surface of the sample 103 are scattered and emitted.

Each of the laser devices 101A and 101B is the laser device of Embodiment 1. However, the pumping light source 15 is shared by the two laser devices. The pumping light is split into two light beams which are used by the laser devices 101A and 101B, respectively. The laser light beams from the laser devices 101A and 101B are applied to the vicinity of the surface of the sample 103 in parallel to the surface. Each of the laser devices 101A and 101B is set to the high-output mode or the wideband mode in accordance with the ionization scheme for ionizing a target element or isotope, and the wavelength of laser light is selected in accordance with the ionization scheme for ionizing the target element or isotope. The laser light from one of the laser devices 101A and 101B has a wavelength corresponding to the energy between the ground level of the target element or isotope and a predetermined intermediate excitation level. The wavelength of the laser light from the other laser device is used for ionization from the intermediate excitation level. Also, the two laser devices 101A and 101B are controlled such that time synchronization is established between the laser devices 101A and 101B and are controlled such that they are synchronized with the focused ion beam. Notably, the time synchronization between the laser light beams of the two laser devices 101A and 101B can be realized by, for example, controlling the apertures of the diaphragms 16 of the laser devices 101A and 101B.

Figure 9:
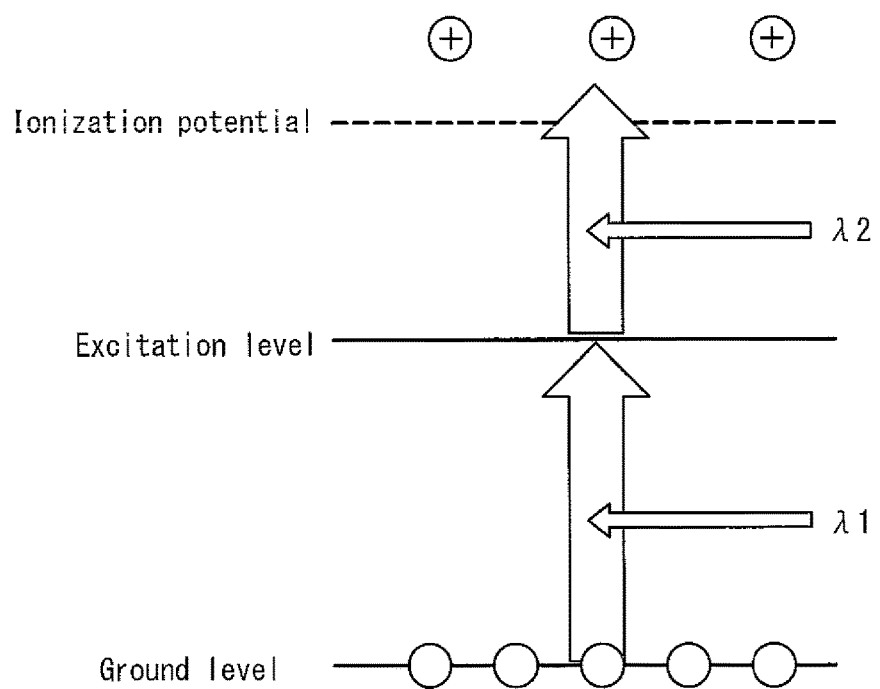
FIG. 9 Illustration used for describing laser resonance ionization.

The laser light beams of the two laser devices 101A and 101B are applied to the neutral atoms sputtered from the surface of the sample 103 as a result of application of the focused ion beam. Since the wavelengths of the laser light beams are a wavelength corresponding to the energy from the ground level to the predetermined intermediate excitation level and a wavelength used for ionization from the intermediate excitation level, the atoms are ionized as a result of two color resonance excitation and ionization (see FIG. 9). In this manner, only the target element or isotope can be selectively ionized.

Also, since each of the laser devices 101A and 101B is configured such that the non-linear optical crystal 14 is disposed within the resonator, a change in the radiation direction of laser light (the irradiation position of laser light) occurring when the wavelength of laser light is changed is small. Therefore, the irradiation positions of two laser light beams from the laser devices 101A and 101B can be easily synchronized, and ionization can be performed highly efficiently.

Also, the atoms sputtered from the surface of the sample 103 by the focused ion beam have an energy of about several eV and have an expanded range of resonance wavelength due to the Doppler effect. Since each of the laser devices 101A and 101B can easily control the spectral band width by using the diaphragm 16, ionization can be performed more efficiently by controlling the spectral band width in accordance with the velocity spread of the target atoms. Also, the energy levels of an atom slightly differ between isotopes due to isotope shift and hyperfine splitting, and a difference of several tens MHz to several GHz is present between the isotopes. Such a difference can be detected by controlling the spectral band width, whereby the accuracy in identifying each isotope can be improved.

The TOF mass spectrometer 102 extracts, by using an electrode, the ions obtained through laser resonance ionization as a result of application of the laser light beams, accelerates the ions, and detects the accelerated ions by using a detector. Since the time required for the ions to reach the detector depends on the mass thereof, mass analysis can be performed by analyzing the reaching time. Also, an element image or an isotope image of the surface of the sample 103 can be obtained by changing the irradiation position of the focused ion beam on the surface of the sample 103 by the focused ion beam source 100. Notably, a mass spectrometer other than the TOF-type mass spectrometer may be used. For example, mass spectrometers of various types, such as a quadrupole mass spectrometer, a magnetic field sector mass spectrometer, and an ion cyclotron resonance mass spectrometer, can be used.

As described above, in the mass analyzing apparatus of Embodiment 2, the mode of each of the laser devices 101A and 101B can be simply switched between the high-output mode and the wideband mode. Therefore, it is possible to select the optimum mode in accordance with an ionization scheme to be used and to perform ionization highly efficiently.

Also, since the beam position changes of the laser light beams output from the laser devices 101A and 101B are small and the variations of the outputs are small, atoms can be excited efficiently, and ionization can be performed highly efficiently.

Also, the spectral band width of laser light output from each of the laser devices 101A and 101B can be easily controlled. The atoms sputtered from the surface of the sample 103 by the focused ion beam have an energy of about several eV and have an expanded range of resonance wavelength due to the Doppler effect. By controlling the spectral band width in accordance with the velocity spread of such target atoms, ionization can be performed more efficiently.

As a result of the above, the mass analyzing apparatus of Embodiment 2 can perform the mass analysis of the sample 103 at high speed and with high accuracy, and can obtain the element image or the isotope image of the surface of the sample 103 at high speed and with high accuracy.

INDUSTRIAL APPLICABILITY

The laser device of the present disclosure can be utilized as a laser device for laser resonance ionization.

DESCRIPTION OF REFERENCE NUMERALS

10: titanium-doped sapphire crystal
11A, 11B: concave mirror
12: grating
13: output mirror
14: non-linear optical crystal
15: pumping light source
16: diaphragm
17: prism
20: rotation stage
21: stage
22: mount
23: PC
24: wavelength meter
100: focused ion beam source
101A, 101B: laser device
102: TOF mass spectrometer

The invention claimed is:

1. A laser device for laser resonance ionization which is wavelength variable comprising:
    a resonator including an output mirror and a grating for selecting a wavelength through rotation thereof;
    a titanium-doped sapphire crystal disposed within the resonator and serving as a laser medium; and
    a pumping light source for applying pumping light to the sapphire crystal,
    wherein the sapphire crystal is movable in an optical axis direction of laser light.

2. A laser device according to claim 1, further comprising a non-linear optical crystal disposed within the resonator and producing a higher-order harmonic from the fundamental laser light,
    wherein the non-linear optical crystal is rotatable, and a rotational angle of the non-linear optical crystal is controlled such that a position of a beam of the laser light becomes constant irrespective of a change in the wavelength of the higher-order harmonic.

3. A laser device according to claim 2, wherein
    the rotational angle of the non-linear optical crystal is controlled on the basis of a calibration curve representing the relation between the wavelength of the higher-order harmonic and the rotational angle of the non-linear optical crystal at which an output of the higher-order harmonic becomes the maximum, and
    the calibration curve is an approximation curve obtained by performing approximation, through use of a third or higher order polynomial function, on the basis of measurement data of the rotational angle of the non-linear optical crystal at which the output of the higher-order harmonic becomes the maximum.

4. A laser device according to claim 1, further comprising a diaphragm disposed within the resonator and being capable of restricting a transverse mode of light.

5. A mass analyzing apparatus comprising:
    a focused ion beam source which applies an ion beam to a sample such that atoms are emitted from the sample;
    a laser device according to claim 1 which applies laser light to the atoms emitted from the sample so as to ionize the atoms; and
    a mass spectrometer which performs mass analysis of the ionized atoms.

6. A method for controlling a laser device for laser resonance ionization which is wavelength variable and includes a resonator including an output mirror and a grating for selecting a wavelength through rotation thereof, a titanium-doped sapphire crystal disposed within the resonator and serving as a laser medium, and a pumping light source for applying pumping light to the sapphire crystal,
    the method being wherein the sapphire crystal is rendered movable in an optical axis direction of laser light, and a high-output mode which provides high output at a gain peak or a wideband mode which provides a wider wavelength-variable range as compared with the high-output mode is selected by changing the position of the sapphire crystal.

7. A method for controlling a laser device according to claim 6, wherein a non-linear optical crystal for producing a higher-order harmonic from the fundamental laser light is further disposed within the resonator, the non-linear optical crystal is rendered rotatable, and a rotational angle of the non-linear optical crystal is controlled such that a position of a beam of the laser light becomes constant irrespective of a change in the wavelength of the higher-order harmonic.

8. A method for controlling a laser device according to claim 6, wherein the rotational angle of the non-linear optical crystal is controlled on the basis of a calibration curve representing the relation between the wavelength of the higher-order harmonic and the rotational angle of the non-linear optical crystal at which an output of the higher-order harmonic becomes the maximum, and the calibration curve is an approximation curve obtained by measuring the rotational angle of the non-linear optical crystal at which the output of the higher-order harmonic becomes the maximum and performing approximation, through use of a third or higher order polynomial function, on the basis of measurement data obtained through the measurement.

9. A method for controlling a laser device according to claim 6, wherein a diaphragm capable of restricting a transverse mode of light is further disposed within the resonator, and a spectrum band width of laser light is controlled by a diameter of an aperture of the diaphragm.

\* \* \* \* \*